(12) United States Patent
Cole et al.

(10) Patent No.: US 9,817,908 B2
(45) Date of Patent: Nov. 14, 2017

(54) SYSTEMS AND METHODS FOR NEWS EVENT ORGANIZATION

(71) Applicants: Raytheon Company, Waltham, MA (US); The Penn State Research Foundation, University Park, PA (US)

(72) Inventors: Robert J. Cole, Pa Furnace, PA (US); Brian J. Simpson, State College, PA (US); Clyde Lee Giles, State College, PA (US); Zhaohui Wu, Waltham, MA (US); Chen Liang, Waltham, MA (US)

(73) Assignees: Raytheon Company, Waltham, MA (US); The Penn State Research Foundation, University Park, PA (US)

( * ) Notice: Subject to any disclaimer, the term of this patent is extended or adjusted under 35 U.S.C. 154(b) by 188 days.

(21) Appl. No.: 14/583,905

(22) Filed: Dec. 29, 2014

(65) Prior Publication Data

US 2016/0188590 A1    Jun. 30, 2016

(51) Int. Cl.
    *G06F 21/57*    (2013.01)
    *G06F 17/30*    (2006.01)

(52) U.S. Cl.
    CPC ............................... *G06F 17/3087* (2013.01)

(58) Field of Classification Search
    None
    See application file for complete search history.

(56) References Cited

U.S. PATENT DOCUMENTS

| | | | |
|---|---|---|---|
| 7,568,148 B1 | 7/2009 | Bharat et al. | |
| 7,577,654 B2 | 8/2009 | Brants et al. | |
| 7,797,265 B2 | 9/2010 | Brinker et al. | |
| 7,907,140 B2 | 3/2011 | Landau et al. | |
| 8,483,382 B2 | 7/2013 | McGary et al. | |
| 8,645,973 B2* | 2/2014 | Bosworth | G06F 12/0875 719/320 |
| 8,788,848 B2* | 7/2014 | Kirovski | G11B 20/00086 369/275.5 |
| 8,825,798 B1 | 9/2014 | Johnson et al. | |

(Continued)

OTHER PUBLICATIONS

"Creative Writing Software 101.com", [online]. [archived on Jan. 9, 2014]. Retrieved from the Internet: <URL: https://web.archieve.org/web/20140109202834/http://www.creativewritingsoftware101.com/storybase-writing-software.php>, (2014), 3 pgs.

(Continued)

*Primary Examiner* — Wilson Lee
(74) *Attorney, Agent, or Firm* — Schwegman Lundberg & Woessner, P.A.

(57) ABSTRACT

Generally discussed herein are systems, apparatuses, and methods for organizing and/or searching news events. In one or more embodiments, a method can include encoding a news event based on named entities, actors, and actions mentioned in the news event, calculating a locality sensitive hash (LSH) key on the news event encoding, comparing the calculated LSH key to a plurality of LSH keys of respective stories, wherein each story of the respective stories comprises one or more associated news events that include LSH keys that are within a specified distance from each other, and associating the news event with a story of the respective stories that includes an LSH key that has a smallest distance from the LSH key of the received news event and is less than the specified distance.

20 Claims, 6 Drawing Sheets

(56) References Cited

U.S. PATENT DOCUMENTS

| | | | |
|---|---|---|---|
| 2003/0103654 A1* | 6/2003 | Lapstun | G06Q 10/10 382/119 |
| 2006/0218031 A1 | 9/2006 | Weinberg et al. | |
| 2007/0106754 A1* | 5/2007 | Moore | G06F 17/3089 709/217 |
| 2008/0040321 A1 | 2/2008 | Baeza-yates | |
| 2011/0082824 A1* | 4/2011 | Allison | G06N 99/005 706/20 |
| 2011/0307085 A1* | 12/2011 | Selby | G10L 25/18 700/94 |
| 2013/0185611 A1* | 7/2013 | Goettfert | G06F 11/1008 714/766 |
| 2013/0290232 A1 | 10/2013 | Tsytsarau et al. | |
| 2013/0291060 A1* | 10/2013 | Moore | G06F 21/6245 726/1 |
| 2014/0006328 A1 | 1/2014 | Blanco et al. | |
| 2014/0033288 A1* | 1/2014 | Wynn | H04W 12/08 726/7 |
| 2014/0095425 A1 | 4/2014 | Sipple | |

OTHER PUBLICATIONS

"TABARI Program and Source Code.", [online]. [archived on Jun. 28, 2014]. Retrieved from the Internet: <URL: http://web.archive.org/web/20140628191359/http://eventdata.parusanalytics.com/software.dir/tabari.html>, (2014), 3 pgs.

"The GDELT Project", [online]. © The Project 2013-2014. [archived on Oct. 24, 2014]. Retrieved from the Internet: <URL: http://web.archive.org/web/20141024075423/>, (2014), 11 pgs.

Amodeo, G., et al., "Hybrid Models for Future Event Prediction", Proceedings of the 20th *ACM international Conference on Information and Knowledge Management, CIKM '11*, Oct. 24-28, 2011, Glasgow, Scotland, UK, (2011), 1981-1984.

Blei, David M., et al., "Supervised topic models", *Advances in Neural Information Processing Systems 20, NIPS 2007*, (2007), 1-8.

Broder, A. Z., "On the resemblance and containment of documents", *Sequences '97: Proceedings of the Compression and Complexity of Sequences*, (1997), 21-29.

Charikar, M. S., et al., "Similarity Estimation Techniques from Rounding Algorithms", In: *Proceedings of the Thirty-Fourth Annual ACM Symposium on Theory of Computing*, (May 2002), 9 pgs.

Ester, Martin, et al., "A Density-Based Algorithm for Discovering Clusters in Large Spatial Databases with Noise", *In: Proceedings of 2nd International Conference on Knowledge Discovery and Data Mining, KDD '96*, (1996), 226-231.

Gionis, A., et al., "Similarity Search in High Dimensions via Hashing", *Proceedings of the Twenty-Fifth International Conference on Very Large Data Bases*, (1999), 518-529.

Hartigan, J. A., et al., "Algorithm AS 136: A K-Means Clustering Algorithm", *Applied Statistics*, 28(1), (1979), 100-108.

Kohlschutter, C., et al., "Biolerplate Detection Using Shallow Text Features", *In: Proceedings of the Third ACM International Conference on Web Search and Data Mining, WSDM '10*, (2001), 441-450.

Lavrenko, V., et al., "Relevance-Based Language Models", *In: Proceedings of SIGIR*, (2001), 120-127.

Leetaru, Kalev, "Global Data on Events, location, and Tone, 1979-2012", presented at the International Studies Association Meeting, San Francisco, CA, (Apr. 2013), 51 pgs.

Lin, J., "Divergence Measures Based on the Shannon Entropy", *IEEE Transactions on Information Theory*, 37(1), (1991), 145-151.

Lv, Yuanhua, et al., "Learning to model relatedness for news recommendation", *Proceedings of the 20th International Conference on World Wide Web, WWW '11*, (2011), 57-66.

Martineau, Justin, et al., "Delta TFIDF: An Improved Feature Space for Sentiment Analysis", *Third AAAI International Conference on Weblogs and Social Media*, (May 2009), 4 pgs.

Pauleve, Loic, et al., "Locality sensitive hashing: A comparision of hash function types and querying mechanisms", *Pattern Recognition Letters*, 31(11), (2010), 1348-1358.

Ponte, J. M., et al., "A language modeling approach to information retrieval", *In: Proceedings of the 21st Annual International ACM SIGIR Conference on Research and Development in Information Retrieval, SIGIR, '98*, (1998), 275-281.

Radinsky, Kira, "Learning causality for news events prediction", *Proceedings of the 21st International Conference on World Wide Web, WWW'12*, (2012), 909-918.

Radinsky, Kira, et al., "Mining the Web to Predict Future Events", *Proceedings of the Sixth ACM International Conference on Web Search and Data Mining, WSDM '13*, (2013), 255-264.

Robertson, S. E., et al., "Okapi at TREC-3", NIST Special Publication 500-226: Overview of the Third Text REtrieval Conference (TREC-3), (1995), 109-127.

Salton, G, et al., "A Vector Space Model for Automatic Indexing", *Communications of the ACM*, vol. 18, No. 11, (Nov. 1975), 613-620.

Shahaf, Dafna, et al., "Connecting the Dots Between News Articles", *Proceedings of the 16th ACM SIGKDD International Conference on Knowledge Discovery and Data Mining, KDD '10*, Jul. 25-28, 2010, Washington, D.C., (2010), 623-632.

Sigurbjornsson, Borkur, "Language Modeling for Information Retrieval", *Journal of Logic, Language and Information*, 13(4), (Mar. 2004), 531-534.

Wu, Zhaohui, et al., "Storybase: Towards Building a Knowledge Base for News Events", *Proceedings of ACL-IJCNLP 2015 System Demonstrations*, (2015), 133-138.

Yang, Yiming, et al., "A Study on Retrospective and On-line Event Detection", *Proceedings of the 21st annual international ACM SIGIR conference on Research and Development in Information Retrieval, SIGIR '98*, (1998), 28-36.

Yeung, Ching-Man Au, et al., "Studying How the Past is Remembered: Towards Computational History Through Large Scale Text Mining", *Proceedings of the 20th ACM International Conference on Information and Knowledge Management, CIKM '11*, (2011), 1231-1240.

Zhai, Chengxiang, et al., "A Study of Smoothing Methods for Language Models Applied to Information Retrieval", *ACM Transactions on Information Systems*, 22(2), (Apr. 2004), 179-214.

Zhang, Wenbin, et al., "Trading Strategies to Exploit Blog and News Sentiment", *Proceedings of the Fourth International AAAI Conference on Weblogs and Social Media*, (2010), 375-378.

\* cited by examiner

SYSTEMS AND METHODS FOR NEWS EVENT ORGANIZATION

TECHNICAL FIELD

Embodiments discussed herein generally relate to systems and methods for organizing news event data and/or searching news event data.

BACKGROUND

People may be overwhelmed by the flood of information provided online. This is especially true as the amount of data online grows and becomes increasingly ubiquitous. People may lose track of a big picture of a news event when the news event is frequently updated.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
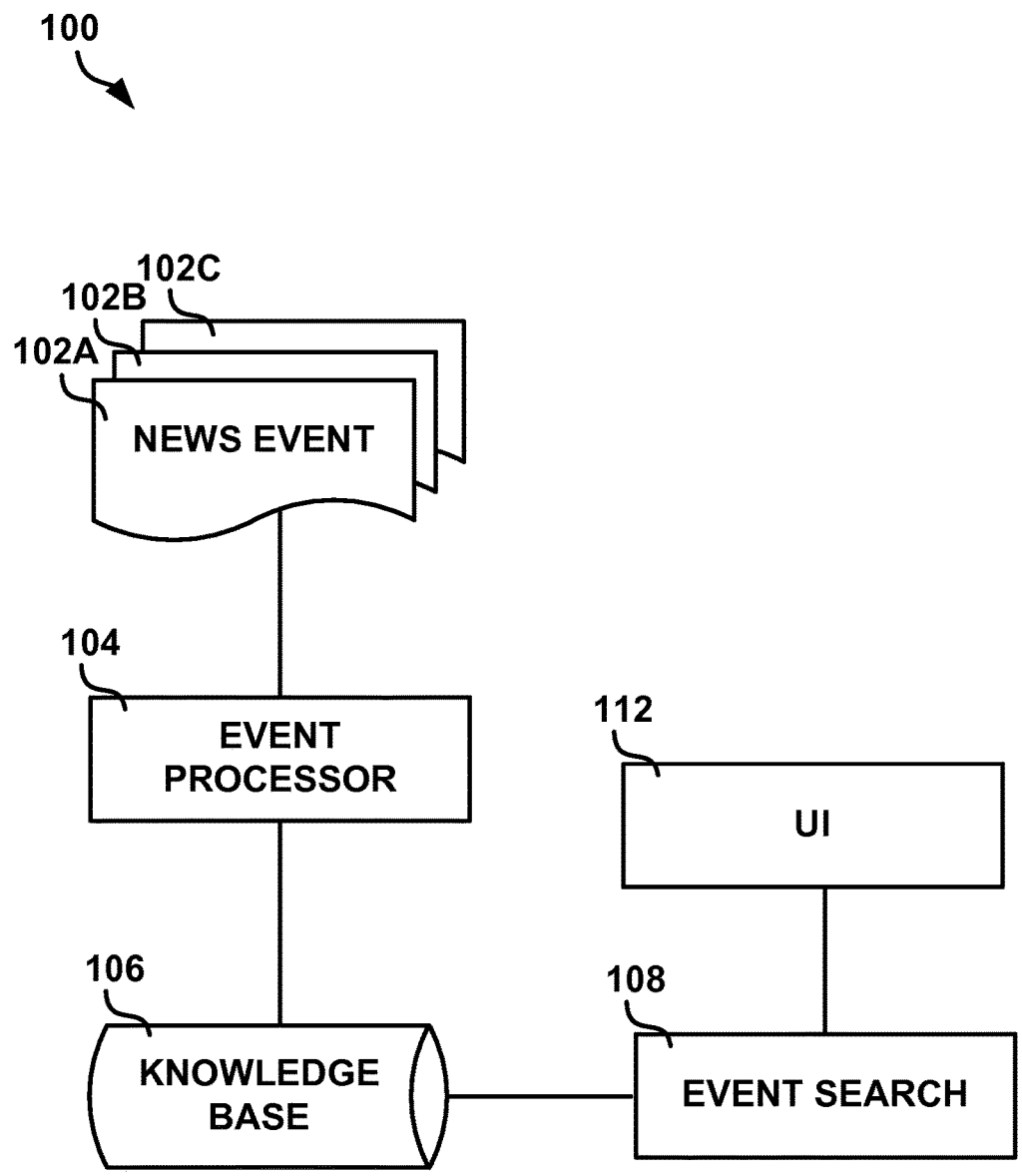
FIG. 1 illustrates, by way of example, a block diagram of an embodiment of a system for organizing news event data.

Embodiments in this disclosure generally relate to organizing news event data. One or more embodiments may help in providing a coherent (e.g., big picture) view of a news event.

It may be difficult to coherently connect isolated pieces of information to form a big picture. Taking web news as an example, current news search engines or aggregator sites, such as Google News (https://news.google.com/) or Yahoo news (http://news.yahoo.com/), currently show isolated daily news events, without linking to previous news events or showing storylines of different news stories (a "story" is an aggregation of related news events). If users want to find out news stories about the "airline crash", for example, they get clusters of news reports without explicit themes, such as can include repetitions of the same stories.

A way (e.g., a more coherent way) to show a news story or event can include showing news stories, such as the airline crash news events, based on their storylines (i.e. news event chains). In this manner, a user can easily view the evolution of a story. Such story lines can be presented to users by building a knowledge base that stores the daily update news events in a semantic coherent schema that has the potential to explicitly capture the news stories based on their evolving timelines. Such a knowledge base can enable an improved news event search, visualization, and/or a better user experience, such as by presenting news stories in a chronology of news events.

Such a knowledge base may help enable analysis of causal event patterns to help forecast future news events. Building an event knowledge base from scratch is challenging, not only because there is a large amount of diverse news events happening every day, but also because there is no gold standard for comparison for news stories and their timelines.

The Wikipedia current events project (http://en.wikipedia.org/wiki/Portal:Current_events) provides manually edited news events that can be used as a basis for building a knowledge base. Other news sources that may be used in building the knowledge base include linking daily crawled news sources to the knowledge base either through fitting into existing stories or creating new stories. Other news event repositories may serve as a basis for a knowledge base.

Event detection and processing and storyline construction discussed herein may include a modified locality-sensitive hashing in a knowledge base concept space (e.g., a Wikipedia concept space). A concept is a searchable entry on the knowledge base and a category defines relations between searchable entries. For example, a category of "international relations" may include a news event link to a knowledge base page on the concept of "China" or "United States of America".

One application of such a knowledge base includes an event search. The former can be regarded as a tool for reviewing the past and current news while the latter focuses on exploring the future using historical knowledge. A news event search engine based on the knowledge base was built that shows news stories and their event chains using various ranking functions and facets. A query-story relevance model was built that measures the textual relevance between queries and news stories.

FIG. 1 illustrates, by way of example, a block diagram of an embodiment of a system 100. The system 100 as illustrated includes a plurality of news events 102A, 102B, and 102C, an event processing module 104, a knowledge base 106, and an event search module 108. The event processing module 104 takes as an input daily crawled web news articles and current events, generates storylines, and builds the knowledge base 106.

The event search module 108 provides a query-based interface (e.g., graphical user interface (GUI) or other interface) to visualize the contents of the knowledge base 106. Each of these operations is discussed further below.

As used herein a "news event" is one or more news articles covering reported news. A "story" is a set of topically related news events. Note that a news event may be a part of multiple stories. A "storyline" is a series of temporally ordered news events of the same story. An "actor" in an event is a named entity that makes or receives actions. An "action" is a verb that connects actors.

A news event may be depicted on a user interface (UI)) (see FIGS. 4A and 4B for example) by a text frame with a description of the news event. For example a description of a news event 102A-C can include "Malaysia Airlines loses contact with a Boeing 777-200ER passenger plane carrying 239 people from Kuala Lumpur to Beijing". This news event may include multiple titles from different news sources (e.g., web sites). A story that the news event may be related to can be titles "Malaysia Airlines Flight 370". The story can contain temporally evolved events, which form a storyline.

"Malaysia Airlines" and "Boeing 777-200ER passenger plane" are actors and "loses contact with" is an action, for example.

The news events 102A-C can include a static news event corpus, such as the New York Times, or Reuter's corpus, or a dynamic corpus, such as daily updated news corpuses, for example, the Wikipedia current events corpus, the New York Times news feed, the BBC, etc. The Wikipedia current events corpus lists manually selected and edited news events since 1998.

An example of the events in a day recorded on the Wikipedia current events corpus provides semantics and structure for news stories and news events, such as story name, event category, and links to Wikipedia concepts. For example, a news event from May 1, 2014 on the Wikipedia current events includes a news event titled "Pro-Russian militants seize the regional prosecutor's office in the eastern Ukrainian city of Donetsk". This news event is under the story heading "2014 pro-Russian unrest in Ukraine" which resides under the category "Armed conflicts and attacks". By connecting events under the same story name, a storyline can be created. The category labels such as "Armed conflicts and attacks" and "Business and economy" provide a way to classify the news events. However, the category labels on current events pages are not always consistent. For example, one may categorize "2014 pro-Russian unrest in Ukraine" under "Armed conflicts and attacks", while another user might categorize the same story under "Attack and conflict". The different category labels can be identified and related where appropriate. These categories can be consolidated into a smaller number of categories that include less overlapping subject matter. For example, one such set of categories that include less overlapping subject matter can include: 1) conflict and attack; 2) disaster and accident; 3) international relations; 4) politics and elections; 5) law and crime; 6) business and economy; 7) science and technology; 8) sports; 9) arts and culture; 10) health, medicine, and environment; 11) education; and 12) deaths. Other categorizations, can be used, the provided example is merely to facilitate understanding. The story heading can link to an article that describes the story.

These news stories and news events can be organized and stored in the knowledge base 106. The Wikipedia current events basis is merely an example of a basis that can be used to form a knowledge base 106. Another basis can be used.

Other news event resources can be linked to the basis including daily crawled web news event resources. A more comprehensive news source can be created by combining news event resources, such as through linking news event resources. Although a news event source may provide a high quality manually edited news event resource, it may not cover all events for every day. For example, there are eight events listed on the Wikipedia current events page for May 1, 2014. Several events happening that day such as those related to "Malaysia Airlines" and "Nigerian protest" are not listed.

The knowledge base 106 can be made more comprehensive by crawling daily updated news events from one or more dynamic corpuses and adding news events discovered in crawling. The Global Database of Events, Language, and Tone (GDELT) can be leveraged to provide daily updated source Uniform Resource Locators (URLs) of various news publishers since April, 2013. To crawl daily updated news articles the GDELT Daily Updates .zip file can be downloaded, and the last column, i.e., "SOURCE URL", of each record in the file can be extracted.

One or more news events from a static corpus of news events may be added to the knowledge base 106. One such static corpus includes the New York Times Annotated corpus.

Figure 2:
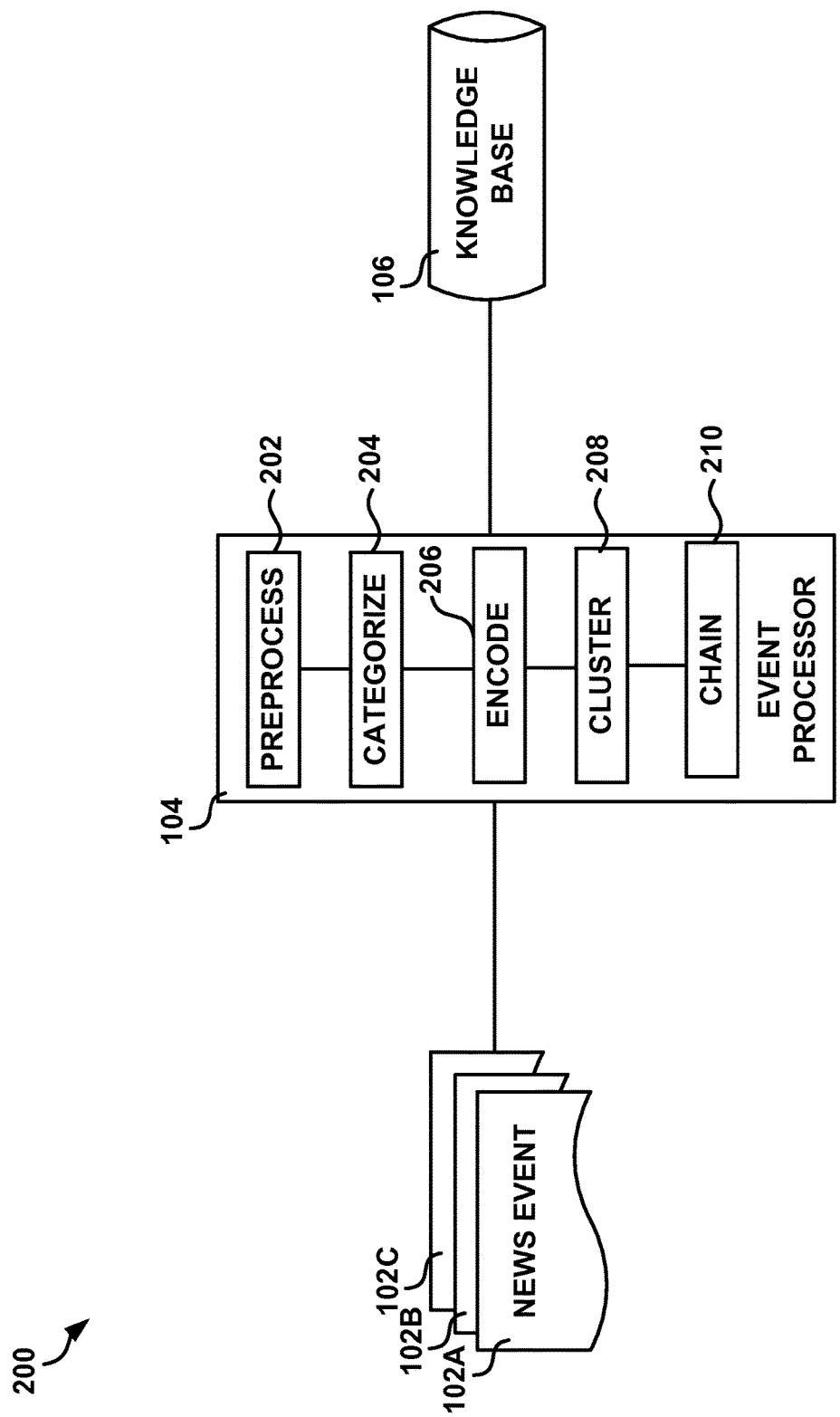
FIG. 2 illustrates, by way of example, a block diagram of an embodiment of a system for organizing news event data.

FIG. 2 illustrates, by way of example, a block diagram of an embodiment of the system 200 that includes a more detailed view of the event processing module 104. The data in the knowledge base 106 can be indexed, tagged, or otherwise organized by the event processing module 104. The news events 102A-C can be received at the event processing module 104. The knowledge base 106 can be incrementally updated with news events 102A-C processed by the event processing module 104. The preprocessing module 104 as illustrated includes a plurality of sub-modules including a preprocessor module 202, a categorization module 204, an event encoding module 206, a clustering module 208, and a chaining module 210.

The preprocessor module 202 can filter the news events 102A-C, extract a title, news content, summary of the news content, date of the news content, and/or URL. The preprocessor 202 can apply a named entity recognition technique, a dictionary matching technique, a concept matching technique, and/or a tagging technique to the news event 102A-C. Filtering the news events 102A-C can include removing news events that include a number of characters below a specified threshold or that do not include a title, date, and/or a URL. Extracting the title, news content, date of the news content, and/or the URL can include using a HyperText Markup Language (HTML) parsing technique, such as that implemented in the open source software Beautiful Soup, Java boilerpipe, or other HTML parsing technique, to extract the title, summary of the news content, news content, date, and/or URL.

The summary can include a specified portion of the content of the news event 102A-C. In one or more embodiments, the summary of the news event can be extracted as a number of sentences or a pre-defined portion of the news event (e.g., a portion of the news event content that is labelled "summary" or similar). The tagging technique can include a Part of Speech (POS) tagging technique to identify nouns, verbs, adverbs, and/or adjectives among other POS tags. The POS tags can help in identifying actors and actions and can help in determining a story with which to cluster the news event and a category under which to categorize the news event.

The categorization module 204 can receive the tags from the preprocessor module 202 and assign a category to a news event using associated tags. The categories can include categories as previously discussed or other categories. The categories generally provide broad concepts that segregate the stories and help in organizing news events 102A-C in the knowledge base 106.

The event encoding module 206 can convert a news event into a vector that includes one or more named entities, one or more actors, and/or one or more actions. The named entities can include one or more actors, such as one or more people, one or more locations, one or more organizations, and/or the date in a news event 102A-C. Among the named entities, there are core entities that play important roles in an event which are called actors herein. Actors appear as subjects or objects in a sentence that describes the news event 102A-C. Actions appear as verbs that connect actors.

The event encoding module 206 can implement a language processing tool, such as Supervised Latent Dirichlet Allocation (sLDA), Conflict and Mediation Event Observations (CAMEO), Integrated Data and Event Analysis (IDEA), Worl Interaction/Event Survey (WEIS), Conflict and Peace Data Bank (COPDAB), and/or Stanford Core Natural Language Processing (NLP), to recognize and/or extract a named entity (e.g., an actor) or an action. The event encoding module 206 can take text or other data format as an input and associate the text with the base form of their use (e.g., noun, verb, adverb, preposition, etc.). The event encoding module 206 can identify concepts appearing in the news event data. A named entity that belongs to a subject or object in the title and/or description of the news event 102A-C can be treated as an actor. Verbs associated with the actor can be actions. The event encoding module 206 can determine a category of a news event 102A-C. The category of the news event 102A-C can be determined using a supervised topic model, such as sLDA. A supervised topic model technique may take news event data and associate words in the news event data to one or more topics of a plurality of topics in the news event data.

Some news events may include metadata or other data that includes a category tag. The provided category tag can be used to determine a category for the news event 102A-C. If a news event 102A-C is determined to be associated with another news event or story, the news event 102A-C can be labelled with the category of the associated news event or story. A news event 102A-C can be labelled with a category of its neighbor as determined using the clustering module 208.

Figure 3:
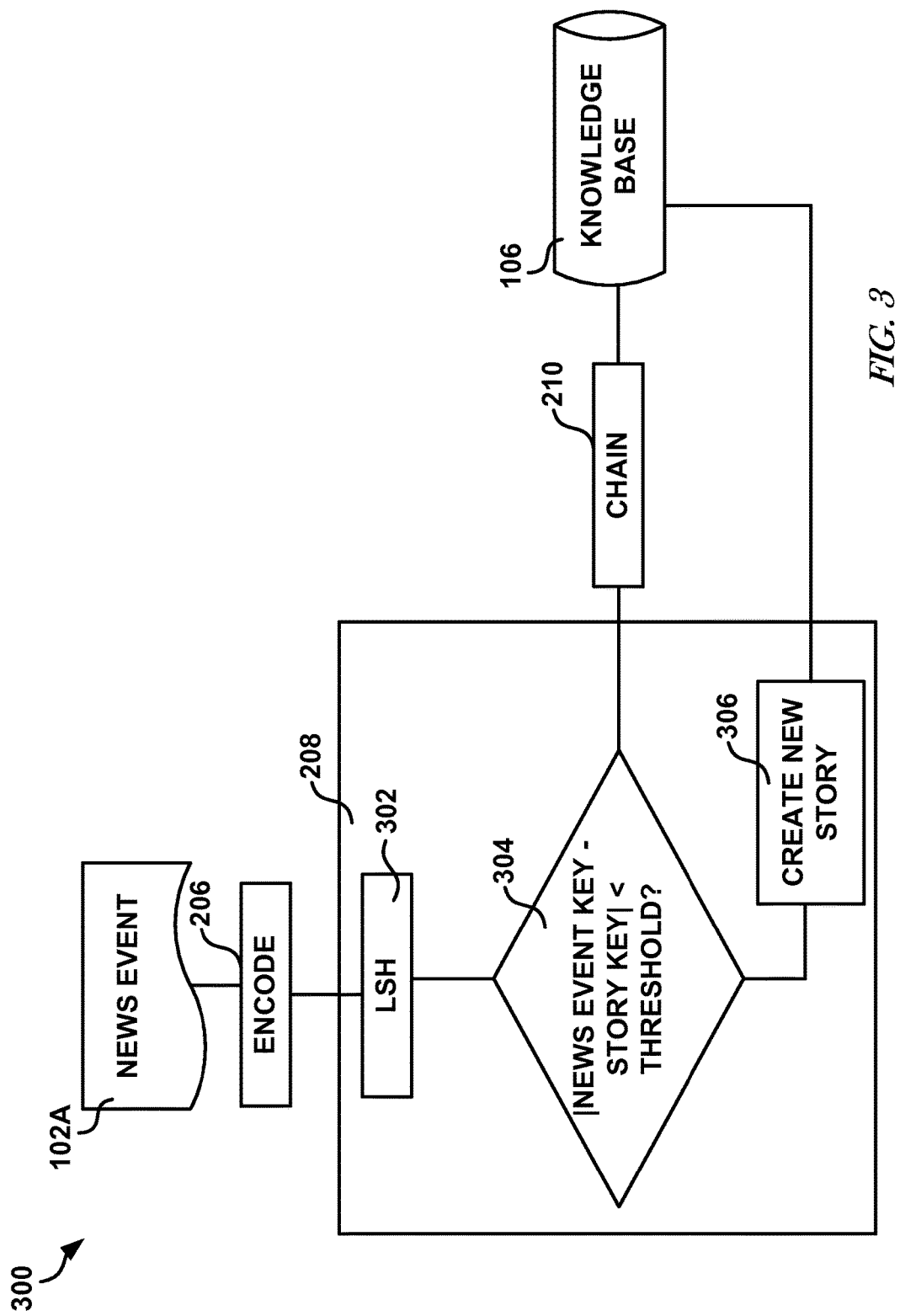
FIG. 3 illustrates, by way of example, a block diagram of an example of a system for organizing news event data.

FIG. 3 illustrates, by way of example, a block diagram of an embodiment of a system 300 that shows a more detailed view of the clustering module 208. The clustering module 208 can group news events 102A-C into event clusters, such as to associate related news events to each other or to determine if a news event 102A corresponds to a story that is not currently in the knowledge base 106. The clustering module 208 can implement a pairwise distance based clustering technique, such as a K-means technique. Such as technique may not be very resource efficient if a large number of news events or stories are present in or are to be added to the knowledge base 106.

The clustering module 208 can implement an approximate nearest neighbor search problem technique, such as a semantic Locality-Sensitive Hashing (LSH). Using such a technique can provide the ability to cluster new news events with stories in the knowledge base 106 incrementally. Semantic LSH is different from min-Hashing and sim-Hashing which us use shingling or bag-of-words in their LSH calculations. Semantic LSH, in contrast, calculates a hash key using at least a portion of the encoded words from the encoding module 206.

As previously discussed, the encoding module 206 encodes a news event 102A-C into a predefined semantic space based on named entities, actions, and/or categories. Then an LSH key, k, is computed, at operation 302, using the encoding of the news event 102A-C. The computed LSH key is compared to LSH keys of stories in the knowledge base 106. An LSH key of a story can be computed based on the contents (e.g., a title, metadata, or text of an event associated with the story) or a description of the story that is provided to summarize the story and its associated events. The LSH key of the news event 102A can be compared to the LSH key of a story at operation 304. Comparing the LSH key of a news event to an LSH key of a story can include computing a distance between the LSH keys. The distance computation can include applying a phonetic similarity heuristic, such as a Hamming distance, a Jaro distance, a Jaro-Winkler distance, a Levenshtein distance, a Damerau-Levenshtein distance technique, or other heuristic. The story whose key has the smallest distance to k can be selected as the story to be associated with the event if the distance is smaller than a threshold, θ. The threshold, θ, may be set as an average distance between temporally neighboring events of the same story. Setting a smaller threshold can help ensure that the news event does not get associated with a story that the news event does not belong with. Repeat news events can be removed by grouping news events that have a same hash key (e.g., an LSH hash key, sim-Hash key, or min-Hash key) and keeping one news event from each group and/or retaining URL links to repeats news events. An enumeration of all possible keys whose distance is within the threshold distance of the keys can be created and associated with the story or news event, such as to help reduce downstream computation. If the distance between the hash keys is greater than the threshold, a new story can be created and associated with the news event 102A-C at operation 306. If the distance between the hash keys is less than the threshold, the news event 102A can be provided to the chaining module 210.

The event chaining module 210 can order (e.g., temporally or order so as to increase a smoothness of a transition between news events) news events of a story. After the cluster module 208 determines the story that the news event 102A-C belongs, the news event 102A-C can be put into the appropriate temporal position of the story by the chaining module 210. The chaining module 210 can determine whether the news event 102A should be merged into the existing news events in the knowledge base 106, or added as a new news event. If the news event 102A is new, it will include some novel information as compared with the other news events in the knowledge base 106. The new news event may also contain information of other events of the same story. There exists a tradeoff between relevance and novelty. The relevance (i.e. similarities and differences between the new news event and news events in the knowledge base 106) can be measured by textual similarity or information retrieval relevance functions such as cosine similarity, BM25, and/or language models with Dirichlet prior or Jelinek-Mercer smoothing, for example.

Given a date and/or time, t, corresponding to the news event 102A, the news event 102A can be compared to other news events associated to the same story. The new event 102A can be compared to news events that are a threshold time from the time, t. A cosine similarity between the news event 102A and the news events within the threshold time from the time, t, can be calculated. A Term Frequency Inverse Document Frequency (TFIDF) technique can be used where the term frequency (TF) is occurrences of a concept (e.g., a word or words) and document frequency (DF) is the number of stories (e.g., event clusters) that include the concept.

Another parameter to consider is that adding a new news event to a story should keep the storyline coherent. Maintaining coherence means a user reading the new storyline should gain a better understanding of the progression of the story after a news event is added. The chaining module 210 can measure coherence between a news event and a story. Two ways of measuring coherence include the Connecting-Dots coherence score and KL-divergence between the news event and the current story in the encoded space.

Suppose the story, S, contains n events, $e_1, \ldots e_n$, coherence can be defined as: Coherence(S)=$\min_{i=1 \ldots n-1} \Sigma_w$ Influence ($e_i, e_{i+1}|w$), where w is an encoded word in the news event and Influence measures how well w connects two news events, or how much contribution w makes to the "connection" of the two news events. Influence can be defined as: Influence ($e_i, e_{i+1}|w$)=$f(e_i|w)f(e_{i+1}|w)/(vec(e_i) \cdot vec(e_{i+1}))$, where $f(e_i|w)$ measures the importance of w in $e_i$, such as by TFIDF, and vec($e_i$) represents the encoded vector of $e_i$ from the encoding module 206.

Another parameter to consider is that adding a new news event to a story should keep the storyline smooth. Smoothness measures how smoothly a story transitions from news event $e_i$ to news event $e_j$. The two news events include some material in common ($e_i \cap e_j$) and some material that is different ($e_i - e_j$) and ($e_i - e_j$). Smoothness is a measure of the transition from known information, $e_i$, to new information, $e_j - e_i$. Smoothness can be measured using a cosine similarity between context vectors, such that $$\text{smoothness}(e_i, e_j) = C(e_i - e_j) \cdot C(e_j - e_i) / (\|C(e_i - e_j)\| \|C(e_j - e_i)\|),$$

where $C(e_i - e_j)$ represents the context vector of $e_i - e_j$. The weight of each dimension of the context vector can be computed using a BM25 relevance score of $e_i - e_j$ to the corresponding news event.

An alternative approach to cosine similarity includes using a word-based context model, where a word-based context is modeled as a unigram language model. The context, of $ei - e_j$ and $e_j - e_i$, or $P(w|e_i - e_j)$ and $P(w|e_j - e_i)$, can be estimated using a relevance mode and applying a Jensen-Shannon divergence. Such a smoothness equation is: smoothness $(e_i, e_j) = 1 /$ $$2 \left( \sum_w P(w \mid e_i - e_j) \log \frac{p(w \mid e_i - e_j)}{p(w \mid M)} + \sum_w P(w \mid e_j - e_i) \log \frac{p(w \mid e_j - e_i)}{p(w \mid M)} \right),$$

$$\text{where } P(w \mid M) = \frac{1}{2}(P(w \mid e_i - e_j) + P(w \mid e_j - e_i)).$$

The event search module 108 can implement a variety of techniques in taking a query as an input and providing an ordered or ranked list of stories or news events from the knowledge base 106. A relevance score (Q, D) between a query, Q, and a story, D, can be calculated. The stories in the knowledge base 106 can be filtered based on the relevance score by the event search module 108. The relevance score can be calculated using a variety of ranking functions, such as BM25, cosine similarity, inner product, and K-L divergence, among others.

BM25 is a "bag-of-words" retrieval function which ranks a set of documents (e.g., a story) based on a query term appearing in each respective document. The BM25 technique does not consider inter-relationships between the query terms within a document. The BM25 technique can be computed as:

$$\text{score}_{BM25}(Q, D) = \sum_{i=1}^{n} IDF(q_i) f(q_i, D)(k_1 + 1) / \left( f(q_i, D) + k_1 \left( 1 - b + b \frac{|D|}{avg(dl)} \right) \right),$$

where $f(q_i, D)$ is $q_i$'s term frequency in D, $|D|$ is the length of the document in words, avg(dl) is the average document length in the corpus, $k_1$ and b are parameters usually chosen as $k_1 \in [1.2, 2.0]$ and $b = 0.75$, and $IDF(q_i)$ is the inverse document frequency of the query term $q_i$ where $IDF(q_i) = \log((N - n(q_i) + 0.5)/(n(q_i) + 0.5))$, where N is the total number of documents in the knowledge base 106 (e.g., the corpus), and $n(q_i)$ is the number of documents containing the term $q_i$.

The inner product measures the similarity between vectors for document $D_j$ and query Q. An inner product score can be computed as: $\text{score}_{innerproduct} = \vec{D_j} \cdot \vec{Q} = \sum_{i=1}^{t} w_{i,j} \cdot w_{q,i}$, where t is the size of a dictionary of terms, $q_i$, $w_{ij}$ is the weight of term, i, in document $D_j$, and $w_{q,i}$ is weight of term $q_i$ in Query, Q.

Cosine similarity measures the cosine of the angle between two document vectors. A cosine similarity score can be calculated by normalizing the inner product score with the vector lengths, such that $$\text{score}_{cos} = \vec{D_j} \cdot \frac{\vec{Q}}{|\vec{D_j}| \cdot |\vec{Q}|} = \sum_{i=1}^{t} w_{i,j} w_{q,i} / \sqrt{\sum_{i=1}^{t} w_{i,j}^2 \sum_{i=1}^{t} w_{q,i}^2}$$

KL-divergence measures a distribution distance between query and document language models. KL-divergence can be calculated as:

$$-D(\hat{\theta}_Q \| \hat{\theta}_D) = \sum_w p(w \mid \hat{\theta}_Q) \log p \left( \frac{w \mid \hat{\theta}_D}{p(w \mid \hat{\theta}_Q)} \right)$$

where $\hat{\theta}_Q$ represents the query language model $\hat{\theta}_D$ represents the news event or story language model. KL-divergence distances can be smoothed using a variety of techniques including a Dirichlet prior smoothing, such that: $p(w|\hat{\theta}_Q) = p_s(w|D)$ if the term, w, appears in the document, D and $p(w|\hat{\theta}_Q) = \alpha_d p(w|D)$ otherwise.

$$A_d = \frac{\mu}{|D| + \mu}$$

and $p_s(w|D)$ can be smoothed by:

$$p_s(w \mid D) = \frac{c(w, D) + \mu p(w \mid C)}{|D| + \mu}$$

where c(w,D) is the number of occurrences of w in D, $|D|$ is the length of D measured by number of words, C is the whole collection of documents in the knowledge base 106, p(w|C) is the probability of w in C, and $\mu$ can be set to be one hundred (100).

Since news stories can be evolving and new news events that may be associated with new news stories come out every day, ranking the retrieved results purely based on textual relevance might not satisfy a user's requirements. For example, users may want to find out the most recent news stories on airlines crashes, or the most popular news stories on airline crashes. To this end, two additional ranking techniques are presented that can re-rank the relevant results. The re-ranking techniques can be implemented by the event search module 108.

One re-ranking technique includes re-ranking using popularity. The popularity measures the impact of the story on the public based on its impact on the Internet. The popularity of a news story can be indicated by many factors such as the authority of the source of the story (e.g., news event), number of reports of the story, the time the story persists on the internet, number of user clicks on a news event associated with the story, views and/or comments of a news event associated with the story, number of shares of a news event associated with the story, tweets related to the story, and likes of a news event in the social media, among others. However, some of this information may be difficult to collect. Another measure of popularity can include the accumulate number of unique news reports for all news events of a story: Popularity(S)=$\Sigma_{e_i} N(e_i)$ where $N(e_i)$ is the number of unique news reports on $e_i$, or number of news reports of different news events of the same story from different sources.

Another re-ranking technique can include re-ranking based on the recency of a story. Recency measures the timeliness or freshness of a story. Recency can be helpful for sorting and filtering news stories before returning stories based on a query. The recency re-ranking can include sorting stories to be returned by the date of their most recent news event.

The stories and news events in the knowledge base 106 can be indexed. The index can include a full-text index for story titles and news event descriptions. For full news events, instead of building an index on text, an index can be on the article's identification (ID). Note that a news event can include links to all news reports of that news event and these news reports can be indexed by ID and a one news event of repeated news events (not sufficiently novel news events) can be indexed by title and/or description. The URLs in the knowledge base 106 may grow faster than the news events in the knowledge base 106 because of the deduplication process. The description of a news event or story can include a summarization of news events associated with the story. The description can include one or more of the most representative sentences of the story or news event (e.g., one or more sentences that include actors, actions, or a category deemed to be relevant to the news event or story). Under this news event search setting, searching on a description can generate relevant results using the techniques described herein. Such a technique can also save time in searching over a search that searches text of stories or news events beyond the description.

To speed up the retrieval of news reports from the knowledge base 106, a B-tree index on the news event ID can be constructed. A full text index can be built using Lucene if such a search is desired.

The news event search module 108 can include a servlet, such as the Java Servlet, to respond to a web query with a web server, such as an Apache Tomcat 7.0.5313, being used to deploy the servlet. Specifically the way a "front-end" (UI and associated computer or network connection (Internet)) interacts with a backend server (e.g., the knowledge base 106) can include sending "GET" requests. An example search URL is provided: "http://breckenridge.ist.psu.edu: 23564/esp/ESPServlet?q=snowden". This search URL can cause the event search module 108 to search stories related to the query 'snowden'. The servlet can be configured to handle the following example parameters: q—Query of the search; e—Event-ID; t—Title of the story; page—This specifies which page of the results will be presented; m—This specifies the method for calculating relevance score (e.g., BM25, cosine similarity, inner product, etc.); and/or sort—This specifies how to sort the returned results (e.g., relevance, popularity, recency, etc.). Other parameters that the servlet (e.g., the news event search module 108) can handle include a date and/or time, a category, a location of the news event, and/or a semantic query. An example of a semantic query includes "disasters with more than 1,000 deaths". An SQL query or a series of SQL queries can be constructed to return stories that most closely satisfy the semantic criteria.

An example query process using the system 100 can include: 1) a user submits a query using the news event search module 108, for example 'snowden'. The news event search module 108 can extract the q value from a URL provided through the UI. 2) The news event search module 108 can collect additional information regarding the query such as page, m, and sort, for example. 3) The news event search module 108 can retrieve candidate stories using an index, which can be implemented by constructing a Structured Query Language (SQL) query to fetch one or more news events from the knowledge base 106. 4) The news event search module 108 can rank each candidate story according to m and/or sort the ranking list according to sort. 5) The news event search module 108 can then provide the news events that are on the page specified by page. These stories can then be displayed to the user. If a user selects a displayed story, the news event search module 108 can issue a query to get a news event with the title, t. If a user selects a news report associated with a news event, the news event search module 108 can set e to the ID associated with the news report. An SQL query can be constructed that retrieves the news report based on the ID.

Figure 4:
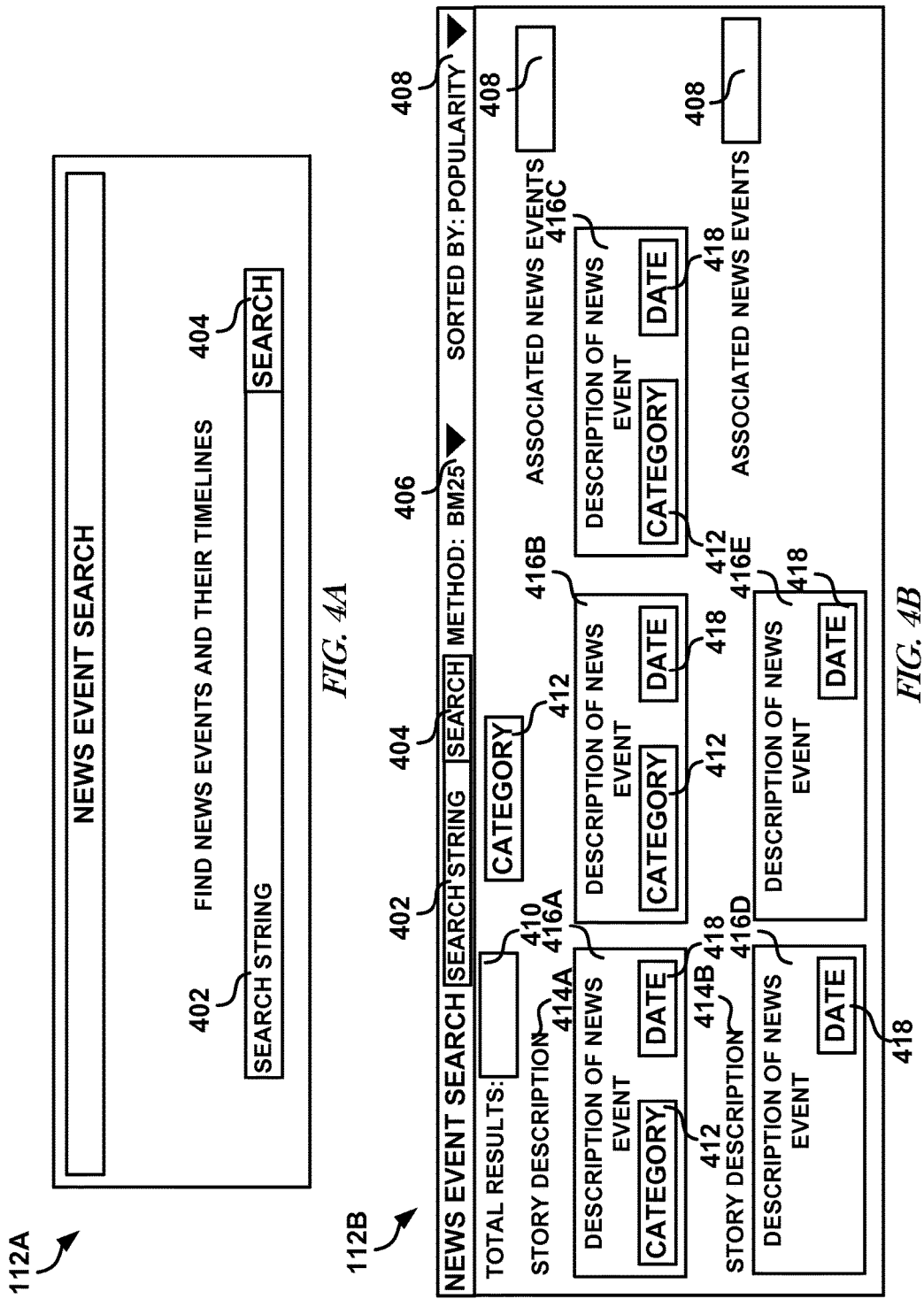
FIG. 4A illustrates, by way of example, a block diagram of an example of a User Interface (UI).
FIG. 4B illustrates, by way of example, a block diagram of an example of a User Interface (UI).

The information retrieved using the news event search module 108 can be presented to the user using a User Interface (UI) 112. FIG. 4A illustrates, by way of example, a block diagram of an embodiment of the UI 112A, which is an example embodiment of the UI 112. The UI 112A as illustrated includes a search box 402 and a control 404 that, when selected submits the search string entered in the search box 402 to the news event search module 108.

FIG. 4B illustrates, by way of example, a block diagram of an embodiment of the UI 112B. The UI 112B can be displayed to a user in response to a user submitting a search string to the news event search module 108. The UI 112B can present the results of the search string provided to the news event search module 108. The UI 112B as illustrated includes the search box 402 and the search string control 404. A user can submit a search request to the news event search module by entering text into the search box 402 and selecting the control 404.

The UI 112B as illustrated includes a drop down control 406 that a user can use to select a method of ranking the stories returned from the news event search module 108. The UI 112B as illustrated includes a drop down control 408 that a user can use to select a method of sorting the ranked stories returned from the news event search module 108. The UI 112B can include a control 410 that conveys to a user the number of results that were determined to be relevant to the search. The UI 112B can include one or more category controls 412 associated with the search, story, or news event returned from the news event search module 108. The UI 112B can include a story description control 414A. The story description control 414A can include one or more sentences from news events associated with the story, such as sentences from the description of the associated news events provided in the new event description controls 416A, 416B, and 416C. The news event description controls 416A-C directly underneath the story description control 414A are news events associated with the story corresponding to the story description in the story description control 414A. Similarly, the news event descriptions 416D and 416E directly underneath the story description 414B are descriptions of news events associated with the story corresponding to the story description in the story description control 414B. The date control 418 can convey a date and/or time associated with the news event in the news event description control 416A-E, respectively.

The news event description controls 416A-C can be organized temporally, such as with the control 416A corresponding to the most recent news event of the story, the control 416B corresponding to the next most recent news event of the story and so on. The controls 416A-C can be displayed in an order which provides the smoothest transitions between news events as determined by a smoothness function or as determined by a method of ranking as selected by a user using the control 406 and/or the control 408. The order in which the story description controls 414A-B can be determined using a technique determined using the techniques selected by the user using the control 406 and/or the control 408.

A user can select (e.g., click, point, hover, press, press the "enter" button, or a combination thereof) a control 406, 408, 410, 412, 414A-B, 416A-E, or 418. In response to the selection, information associated with the control 406, 408, 410, 412, 414A-B, 416A-E, or 418 can be displayed to the user. For example, a user can select the story description control 414A and the UI 112 can display only news events associated with the story corresponding to the story description control 414A, such as to display more news event description controls than are displayed in the UI 112B. In another example, a user can select the news event description control 416A-E and a query can be transmitted by the news event search module 108 to retrieve text associated with a news report associated with the news event.

The controls of the UI 112, 112A-B, can include one or more of a text box, a drop down menu, a radio button, a button, a check box, split button, a cycle button, a slider, a list box, a spinner, a menu (e.g., a menu bar), a toolbar, a combo box, an icon, a link, a container, etc. The controls 406, 408, 410, 412, 414A-B, 416A-E, or 418 can appear in different locations on the UI 112B as long as the coherency of the story is retained.

UI 112B illustrates two and three news events associated with a story (i.e. the number of news event description controls 416A-C presented under the story description controls 414A-B), however fewer or more news events can be associated with a given story. The number of story description controls 414A-B and news event description controls 416A-E can be configurable, such as to include fewer or more on a given UI 112B. More information regarding a news event can be presented to a user in response to a user selecting the news event description control 416A-E.

Figure 5:
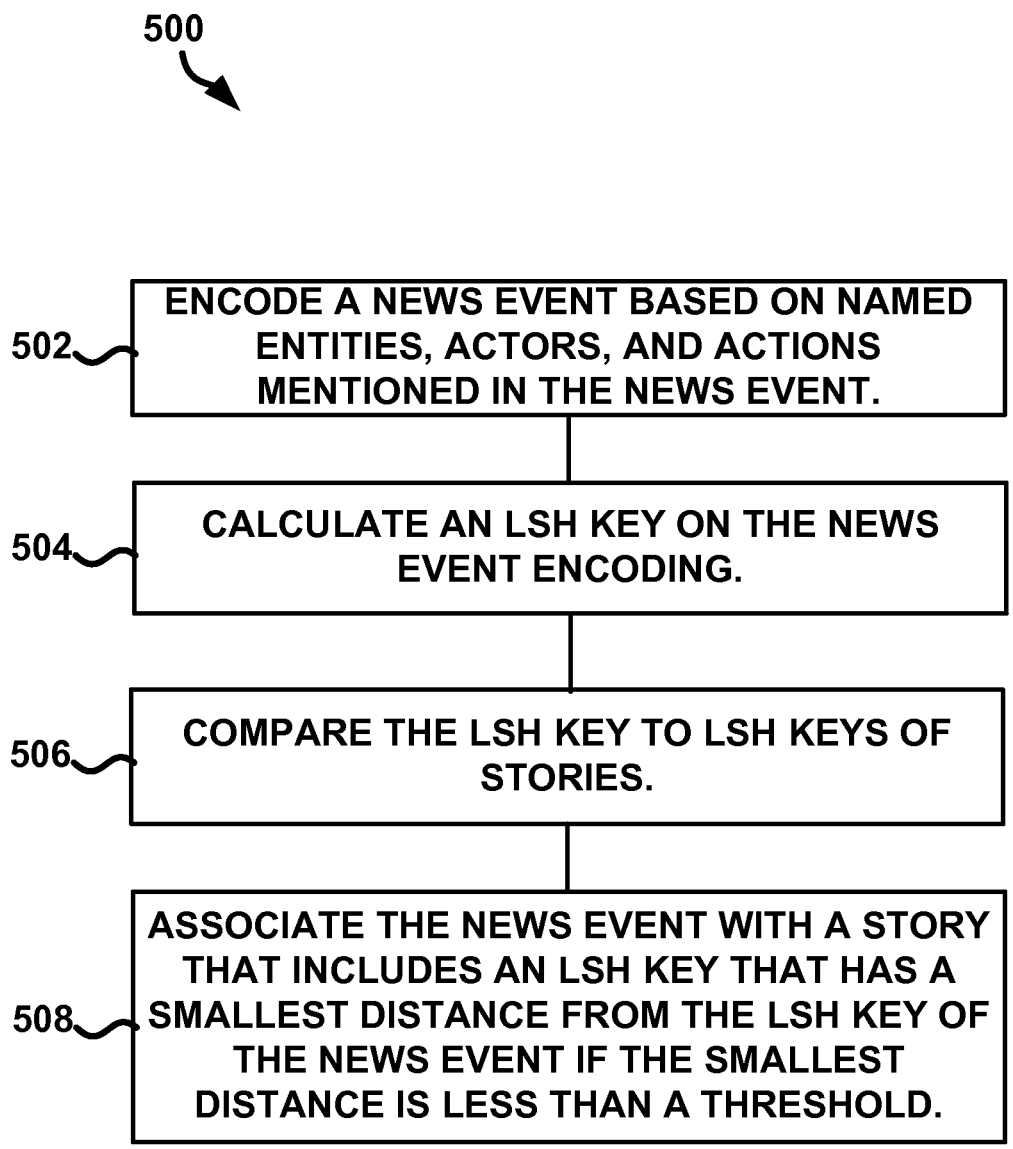
FIG. 5 illustrates, by way of example, a flow diagram of an example of a method for organizing news event data.

FIG. 5 illustrates, by way of example, a flow diagram of an embodiment of a method 500. The method 500 as illustrated includes encoding (e.g., using the encoding module 206) a news event based on named entities, actors, and actions mentioned in the news event at operation 502; calculating (e.g., using the clustering module 208) a locality sensitive hash (LSH) key on the news event encoding at operation 504; comparing (e.g., using the clustering module 208) the calculated LSH key to a plurality of LSH keys of respective stories at operation 506; and associating (e.g., using the clustering module) the news event with a story of the respective stories that includes an LSH key that has a smallest distance from the LSH key of the received news event and is less than a specified distance at operation 508. Each story of the respective stories comprises one or more associated news events that include LSH keys that are within a specified distance from each other.

The method 500 may include creating (e.g., using the clustering module 208) a new story including the news event if the distance is greater than the specified distance. The method 500 may include, in response to associating the news event with the story, chaining (e.g., using the chaining module 210) the news event with other news events of the story. Chaining can include comparing the news event to all other news events of the associated story that include a time parameter that is within a specified time of the time parameter of the news event, wherein the time parameter corresponds to a date the news event was reported. Comparing the news event to all other news events of the associated story includes calculating a smoothness and coherence between the news and each of the news events of the story and placing the news event in a location in the story that maximizes the calculated coherence or the smoothness. The method 500 can include calculating (e.g., using the clustering module 208) a distance between an LSH key of the news event and an LSH of the story includes determining a Hamming distance between the LSH keys.

Systems, apparatuses and methods that help in organizing news events and/or searching the news events are presented herein. Experimental results support that the proposed systems and methods are effective and efficient for event detection (clustering and chaining), and for searching.

Figure 6:
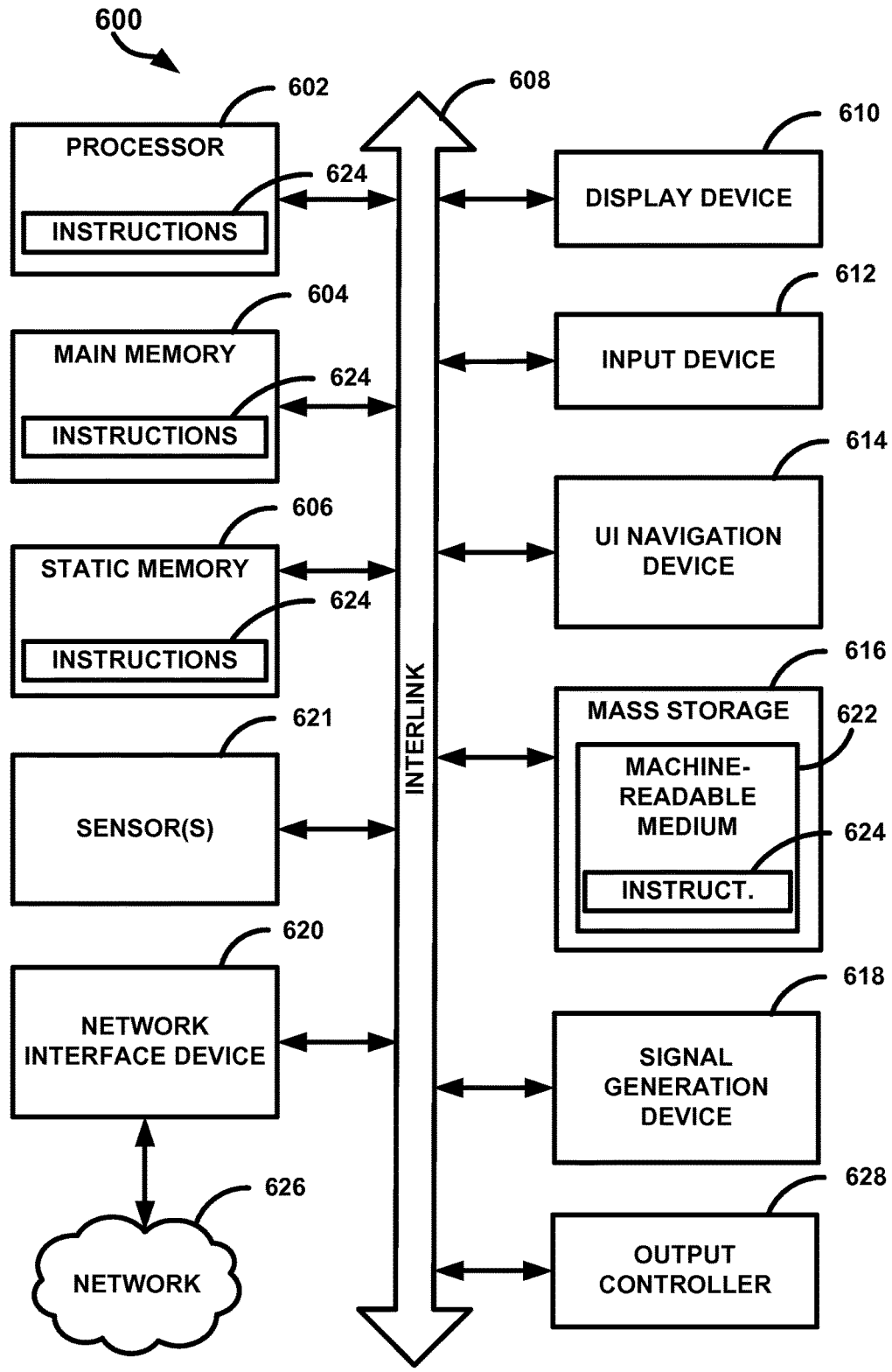
FIG. 6 illustrates, by way of example, a block diagram of an embodiment of a machine upon which one or more processes or operations (e.g., methods) discussed herein may be performed.

FIG. 6 illustrates a block diagram of a machine 600 upon which any one or more of the processes (e.g., methodologies) discussed herein may be performed. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 600 can include a hardware processor 602 (e.g., a central processing unit (CPU), a graphics processing unit (GPU), a hardware processor core, or any combination thereof), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the process or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

EXAMPLES AND NOTES

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use processing circuitry (e.g., a module, such as one or more of the module illustrated in FIGS. 1-3) to encode a news event based on named entities, actors, and actions mentioned in the news event, calculate a locality sensitive hash (LSH) key on the news event encoding, compare the calculated LSH key to a plurality of LSH keys of respective stories, wherein each story of the respective stories comprises one or more associated news events that include LSH keys that are within a specified distance from each other, and associate the news event with a story of the respective stories that includes an LSH key that has a smallest distance from the LSH key of the received news event if the smallest distance is less than the specified distance.

Example 2 can include or use, or can optionally be combined with the subject matter of Example 1, to include or use, wherein the processing circuitry is to create a new story including the news event if the distance is greater than the specified distance.

Example 3 can include or use, or can optionally be combined with the subject matter of at least one of Examples 1-2, to include or use, wherein the processing circuitry is to, in response to the associating the news event with the story, chaining the news event with other news events of the story.

Example 4 can include or use, or can optionally be combined with the subject matter of Example 3, to include or use, wherein the processing circuitry is to compare the news event to all other news events of the associated story that include a time parameter that is within a specified time of the time parameter of the news event, wherein the time parameter corresponds to a date the news event was reported.

Example 5 can include or use, or can optionally be combined with the subject matter of Example 4, to include or use, wherein the processing circuitry is to calculate a smoothness between the news event and each of the news events of the associated story and place the news event in a location in the story associated with the maximum calculated smoothness.

Example 6 can include or use, or can optionally be combined with the subject matter of Example 4, to include or use, wherein the processing circuitry is to calculate a coherence between the news event and each of the news events of the associated story and place the news event in a location in the story associated with the maximum calculated coherence.

Example 7 can include or use, or can optionally be combined with the subject matter of at least one of Examples 1-6, to include or use, wherein the processing circuitry is to calculate a distance between an LSH key of the news event and an LSH of the story includes the processing circuitry to determine a Hamming distance between the LSH keys.

Example 8 can include or use subject matter (such as an apparatus, a method, a means for performing operations, or a machine readable memory including instructions that, when performed by the machine, can configure the machine to perform acts), such as can include or use encoding a news event based on named entities, actors, and actions mentioned in the news event, calculating a locality sensitive hash (LSH) key on the news event encoding, comparing the calculated LSH key to a plurality of LSH keys of respective stories, wherein each story of the respective stories comprises one or more associated news events that include LSH keys that are within a specified distance from each other, and associating the news event with a story of the respective stories that includes an LSH key that has a smallest distance from the LSH key of the received news event and is less than the specified distance.

Example 9 can include or use, or can optionally be combined with the subject matter of Example 8, to include or use, creating a new story including the news event if the distance is greater than the specified distance.

Example 10 can include or use, or can optionally be combined with the subject matter of at least one of Examples 8-9, to include or use, in response to associating the news event with the story, chaining the news event with other news events of the story.

Example 11 can include or use, or can optionally be combined with the subject matter of Example 10, to include or use, wherein chaining includes comparing the news event to all other news events of the associated story that include a time parameter that is within a specified time of the time parameter of the news event, wherein the time parameter corresponds to a date the news event was reported.

Example 12 can include or use, or can optionally be combined with the subject matter of Example 11, to include or use, wherein comparing the news event to all other news events of the associated story includes calculating a smoothness between the news and each of the news events of the story and placing the news event in a location in the story that maximizes the calculated smoothness.

Example 13 can include or use, or can optionally be combined with the subject matter of Example 11, to include or use, wherein comparing the news event to all other news events of the associated story includes calculating a coherence between the news and each of the news events of the story and placing the news event in a location in the story that maximizes the calculated coherence.

Example 14 can include or use, or can optionally be combined with the subject matter of at least one of Examples 8-13, to include or use, wherein calculating a distance between the LSH key of the news event and the LSH key of the story includes determine a Hamming distance between the LSH keys.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system configured for news event organization, the system comprising:
a database comprising past news events;
hardware processing circuitry coupled to the database, the hardware processing circuitry to:
encode a news event based on named entities, actors, and actions mentioned in the news event;
calculate a locality sensitive hash (LSH) key on the news event encoding;
compare the calculated LSH key to a plurality of LSH keys of respective stories, wherein each story of the respective stories comprises one or more associated news events that include LSH keys that are within a specified distance from each other;
remove another news event corresponding to a same LSH key as the news event;
associate the news event with a story of the respective stories that includes an LSH key that has a smallest distance from the LSH key of the received news event if the smallest distance is less than the specified distance; and
a user interface to provide a view of the storyline of the associated story the storyline including one or more past news events and the news event.

2. The system of claim 1, wherein the processing circuitry is to create a new story including the news event if the distance is greater than the specified distance.

3. The system of claim 1, wherein the processing circuitry is to, in response to the associating the news event with the story, chain the news event with other news events of the story.

4. The system of claim 3, wherein the processing circuitry is to compare the news event to all other news events of the associated story that include a time parameter that is within a specified time of a time parameter of the news event, wherein the time parameter corresponds to a date the news event was reported.

5. The system of claim 4, wherein the processing circuitry is to calculate a smoothness between the news event and each of the news events of the associated story and place the news event in a location in the story associated with the maximum calculated smoothness.

6. The system of claim 4, wherein the processing circuitry is to calculate a coherence between the news event and each of the news events of the associated story and place the news event in a location in the story associated with the maximum calculated coherence.

7. The system of claim 1, wherein the processing circuitry is to calculate a distance between an LSH key of the news event and an LSH key of the story includes the processing circuitry to determine a Hamming distance between the LSH keys.

8. A method for news event organization, the method comprising:
encoding, by processing circuitry, a news event based on named entities, actors, and actions mentioned in the news event;
calculating a locality sensitive hash (LSH) key on the news event encoding;
comparing the calculated LSH key to a plurality of LSH keys of respective stories, wherein each story of the respective stories comprises one or more associated news events that include LSH keys that are within a specified distance from each other;
removing another news event that has a same LSH key as the news event;
associating the news event with a story of the respective stories that includes an LSH key that has a smallest distance from the LSH key of the received news event and is less than the specified distance; and
providing, by a user interface, a view of a storyline of the associated story the storyline including one or more past news events of the associated story and the news event.

9. The method of claim 8, further comprising creating a new story including the news event if the distance is greater than the specified distance.

10. The method of claim 8, further comprising, in response to associating the news event with the story, chaining the news event with other news events of the story.

11. The method of claim 10, wherein chaining includes comparing the news event to all other news events of the associated story that include a time parameter that is within a specified time of a time parameter of the news event, wherein the time parameter corresponds to a date the news event was reported.

12. The method of claim 11, wherein comparing the news event to all other news events of the associated story includes calculating a smoothness between the news event and each of the news events of the story and placing the news event in a location in the story associated with the maximum calculated smoothness.

13. The method of claim 11, wherein comparing the news event to all other news events of the associated story includes calculating a coherence between the news event and each of the news events of the story and placing the news event in a location in the story associated with the maximum calculated coherence.

14. The method of claim 8, wherein calculating a distance between an LSH key of the news event and an LSH key of the story includes determine a Hamming distance between the LSH keys.

15. A non-transitory computer readable storage device including instructions that, when executed by a machine, configure the machine to perform operations for news event organization, the operations comprising:
encode a news event based on named entities, actors, and actions mentioned in the news event;
calculate a locality sensitive hash (LSH) key on the news event encoding;
compare the calculated LSH key to a plurality of LSH keys of respective stories, wherein each story of the respective stories comprises one or more associated news events that include LSH keys that are within a specified distance from each other;
remove another news event that has a same corresponding LSH key as the news event;
associate the news event with a story of the respective stories that includes an LSH key that has a smallest distance from the LSH key of the received news event and is less than the specified distance; and
provide signals that cause a user interface to provide a view of a storyline of the associated story the storyline including one or more past news events of the associated story and the news event.

16. The storage device of claim 15, further comprising instructions, which when executed by the machine, configure the machine to create a new story including the news event if the distance is greater than the specified distance.

17. The storage device of claim 15, further comprising instructions, which when executed by the machine, configure the machine to, in response to associating the news event with the story, chain the news event with other news events of the story.

18. The storage device of claim 17, wherein the instructions for chaining include instructions, which when executed by the machine, configured the machine to compare the news event to all other news events of the associated story that include a time parameter that is within a specified time of a time parameter of the news event, wherein the time parameter corresponds to a date the news event was reported.

19. The storage device of claim 18, wherein the instructions for comparing the news event to all other news events of the associated story include instructions, which when executed by the machine, configure the machine to calculate a smoothness and coherence between the news event and each of the news events of the story and place the news event in a location in the story associated with the maximum calculated smoothness or coherence.

20. The storage device of claim 16, further comprising wherein the instructions for calculating a distance between the LSH key of the news event and the LSH key of the story include instructions, which when executed by the machine, configure the machine to determine a Hamming distance between the LSH keys.

\* \* \* \* \*